US008034522B2

(12) United States Patent
Liu et al.

(10) Patent No.: US 8,034,522 B2
(45) Date of Patent: Oct. 11, 2011

(54) POLYESTER TONER RESIN COMPOSITIONS

(75) Inventors: Yongning Liu, Apex, NC (US); Alan Toman, Apex, NC (US); Eric Dumain, Hillsborough, NC (US)

(73) Assignee: Reichhold, Inc., Research Triangle Park, NC (US)

( * ) Notice: Subject to any disclaimer, the term of this patent is extended or adjusted under 35 U.S.C. 154(b) by 783 days.

(21) Appl. No.: 11/937,077

(22) Filed: Nov. 8, 2007

(65) Prior Publication Data

US 2008/0124644 A1 May 29, 2008

Related U.S. Application Data

(60) Provisional application No. 60/858,663, filed on Nov. 13, 2006.

(51) Int. Cl.
G03G 9/087 (2006.01)
(52) U.S. Cl. .................. 430/109.2; 430/109.4
(58) Field of Classification Search .............. 430/109.2, 430/137.15, 109.4
See application file for complete search history.

(56) References Cited

U.S. PATENT DOCUMENTS

| | | | |
|---|---|---|---|
| 3,600,459 A | 8/1971 | Vasta | 260/834 |
| 4,693,952 A | 9/1987 | Koizumi et al. | 430/109 |
| 4,814,249 A | 3/1989 | Oseto et al. | 430/109 |
| 4,908,290 A | 3/1990 | Watanabe et al. | 430/106.6 |
| 4,931,370 A | 6/1990 | Amaya et al. | 430/45 |
| 4,931,375 A | 6/1990 | Akimoto et al. | 430/109 |
| 4,933,252 A | 6/1990 | Nishikawa et al. | 430/109 |
| 5,015,724 A | 5/1991 | Kawabe | 528/272 |
| 5,017,450 A | 5/1991 | Iwanari et al. | 430/106 |
| 5,035,970 A | 7/1991 | Hsieh et al. | 430/109 |
| 5,057,392 A | 10/1991 | McCabe et al. | 430/109 |
| 5,225,304 A | 7/1993 | Kabashima et al. | 430/110 |
| 5,234,787 A | 8/1993 | Morimoto et al. | 430/106.6 |
| 5,241,019 A | 8/1993 | Otsuki et al. | 525/437 |
| 5,358,814 A | 10/1994 | Osterhoudt et al. | 430/106.6 |
| 5,358,817 A | 10/1994 | Wilson et al. | 430/106.6 |
| 5,358,818 A | 10/1994 | Wilson et al. | 430/106.6 |
| 5,368,970 A | 11/1994 | Grushkin | 430/110 |
| 5,370,958 A | 12/1994 | Shin et al. | 430/110 |
| 5,376,494 A | 12/1994 | Mahabadi et al. | 430/137 |
| 5,403,689 A | 4/1995 | Odell et al. | 430/110 |
| 5,407,772 A | 4/1995 | Bayley et al. | 430/109 |
| 5,409,989 A | 4/1995 | Ito et al. | 525/41 |
| 5,429,898 A | 7/1995 | Sugizaki et al. | 430/45 |
| 5,462,829 A | 10/1995 | Tyagi et al. | 430/109 |
| 5,472,818 A | 12/1995 | Hotta et al. | 430/109 |
| 5,506,083 A | 4/1996 | Nash et al. | 430/106 |
| 5,510,222 A | 4/1996 | Inaba et al. | 430/109 |
| 5,518,850 A | 5/1996 | Bayley et al. | 430/109 |
| 5,529,873 A | 6/1996 | Chiba et al. | 430/109 |
| 5,548,059 A | 8/1996 | Bayley et al. | 528/194 |
| 5,578,409 A | 11/1996 | Kotaki et al. | 430/109 |
| 5,595,849 A | 1/1997 | Niinae | 430/106.6 |
| 5,629,121 A | 5/1997 | Nakayama | 430/109 |
| 5,747,210 A | 5/1998 | Emoto et al. | 430/109 |
| 5,750,303 A | 5/1998 | Inaba et al. | 430/110 |
| 5,780,195 A | 7/1998 | Nava | 430/110 |
| 5,834,118 A | 11/1998 | Ranby et al. | 428/482 |
| 5,976,752 A | 11/1999 | Matsunaga et al. | 430/110 |
| 6,020,414 A | 2/2000 | Nelson et al. | 524/424 |
| 6,168,895 B1 | 1/2001 | Metz et al. | 430/106 |
| 6,238,835 B1 | 5/2001 | Tavernier et al. | 430/109 |
| 6,238,836 B1 | 5/2001 | Nakamura et al. | 430/110 |
| 6,248,493 B1 | 6/2001 | Ogura et al. | 430/110 |
| 6,288,166 B1 | 9/2001 | Sata et al. | 525/69 |
| 6,413,691 B2 | 7/2002 | Daimon et al. | 430/109.4 |
| 6,485,875 B1 | 11/2002 | Karaki et al. | 430/128.23 |
| 6,569,590 B2 | 5/2003 | Kuroda et al. | 430/108.6 |
| 6,653,435 B1 | 11/2003 | Aoki et al. | 528/296 |
| 6,660,443 B2 | 12/2003 | Sugiyama et al. | 430/108.4 |
| 6,682,867 B2 | 1/2004 | Kubo et al. | 430/109.2 |
| 6,733,939 B2 | 5/2004 | Nanya et al. | 430/108.22 |
| 6,800,412 B2 | 10/2004 | Sugiyama et al. | 430/108.1 |
| 6,818,293 B1 | 11/2004 | Keep et al. | 428/359 |
| 6,849,371 B2 | 2/2005 | Sacripante et al. | 430/137.14 |
| 6,890,696 B2 | 5/2005 | Farrugia et al. | 430/137.14 |
| 6,936,390 B2 | 8/2005 | Nanya et al. | 430/108.22 |
| 2002/0051924 A1 | 5/2002 | Iiada et al. | 430/109.3 |
| 2002/0064723 A1 | 5/2002 | Nanya et al. | 430/108.22 |
| 2002/0120094 A1 | 8/2002 | Duan | 528/286 |
| 2002/0192586 A1 | 12/2002 | Kubo et al. | 430/109.4 |
| 2003/0134215 A1 | 7/2003 | Kashiwabara et al. | 430/108.4 |
| 2003/0152858 A1 | 8/2003 | Osan et al. | 430/109.3 |
| 2003/0162118 A1 | 8/2003 | Komatsu et al. | 430/124 |
| 2003/0180644 A1 | 9/2003 | Nanya et al. | 430/108.22 |
| 2003/0207186 A1 | 11/2003 | Itakura et al. | 430/45 |
| 2004/0131961 A1 | 7/2004 | Watanabe et al. | 430/108.4 |
| 2004/0137350 A1 | 7/2004 | Yamazaki et al. | 430/108.7 |
| 2004/0137353 A1 | 7/2004 | Iiadi et al. | 430/108.24 |
| 2004/0161688 A1 | 8/2004 | Itakura et al. | 430/108.4 |
| 2004/0175641 A1 * | 9/2004 | Nanya et al. | 430/109.4 |
| 2004/0175642 A1 | 9/2004 | Ida et al. | 430/109.4 |
| 2004/0175643 A1 | 9/2004 | Baba et al. | 430/109.4 |
| 2004/0191657 A1 | 9/2004 | Kubo | 430/108.4 |
| 2004/0209178 A1 | 10/2004 | Ikakura et al. | 430/45 |
| 2005/0079429 A1 | 4/2005 | Hayami et al. | 430/45 |
| 2005/0112488 A1 | 5/2005 | Yamada et al. | 430/108.7 |
| 2005/0191573 A1 | 9/2005 | Smith | 430/109.2 |

FOREIGN PATENT DOCUMENTS

| | | |
|---|---|---|
| EP | 0 551 064 | 7/1993 |
| EP | 1 467 257 | 10/2004 |
| WO | 01/90265 | 11/2001 |
| WO | WO 2007013745 A1 * | 2/2007 |

OTHER PUBLICATIONS

International Search Report and The Written Opinion of the International Searching Authority for PCT/US2007/023720 mailed Apr. 4, 2008.

* cited by examiner

*Primary Examiner* — Christopher Rodee
(74) *Attorney, Agent, or Firm* — Myers Bigel Sibley & Sajovec PA

(57) ABSTRACT

Provided herein are polyester toner resins that may reduce or eliminate the use of Bis A, a common polyester toner resin material that may pose environmental and/or toxicity risks. In addition, the polyester toner resins according to some embodiments of the present invention may have desirable toner resin properties, such as hot offset resistance.

16 Claims, No Drawings

POLYESTER TONER RESIN COMPOSITIONS

CROSS-REFERENCE TO RELATED APPLICATIONS

This application claims the benefit of U.S. Provisional Patent Application No. 60/858,663, filed Nov. 13, 2006, the disclosure of which is herein incorporated by reference in its entirety.

FIELD OF THE INVENTION

The present invention relates to toner resin compositions, and more particularly, to polyester toner resin compositions.

BACKGROUND OF THE INVENTION

In typical dry-type electrophotographic processes, latent electrostatic images formed on a photoconductor are developed by means of a triboelectrically charged toner. Specifically, when an image is formed by a photographic copying machine, a surface of a roller composed of a photoconductive and photosensitive material is charged. An electrostatic latent image is formed by exposure to the light reflected from the surface of an original to be copied. The latent image is developed by a toner, with the formed visible image being transferred to a paper or the like. The transferred image is fixed on the paper by compression under heating, and thus a copy print is obtained.

A typical toner includes several components including a toner resin, a colorant and an electrostatic carrier material. The toner resin is of particular importance in that it seines to bind the other two components. Typically, toner resins are formed from various materials, such as bisphenol epoxy resins, silicone-based resins, styrene butadiene resins, and the like.

One of the problems associated with the fixing of toner is the undesirable transfer of toner to the fusing roller during the fixing process. This undesirable transfer is sometimes referred to as "off setting" and involves the transfer of toner from the substrate to the fusing roller. The transfer of toner to the fusing roller contaminates the fusing roller, which results in the unwanted transfer of toner from the fusing roller onto subsequent substrates passing by the fusing roller. This transfer tends to produce ghost images or unwanted toner marks on subsequent substrates.

The use of crosslinked polyester to prevent offset is generally known. A crosslinked polyester is typically obtained by reacting an esterified bisphenol A (Bis A) with dicarboxylic acid to produce a linear polyester, and then reacting the produced linear polyester with trivalent or higher carboxylic acid, such as trimellitic acid anhydride.

However, due to the relatively high cost of Bis A and the environmental and toxicity concerns associated with Bis A, it would be desirable to develop toner resins that do not include Bis A, or include reduced amounts of Bis A. However, currently available Bis A-free toner resins, e.g., those described in U.S. Pat. No. 5,015,724 to Kawabe, may have undesirable properties, such as brittleness and relatively poor heat resistance. Therefore, it would be desirable to develop toner resins that reduce or eliminate the use of Bis A, yet still have desirable toner resin properties.

SUMMARY OF THE INVENTION

According to some embodiments of the present invention, polyester toner resins may include 40 to 65 weight percent of an aromatic polycarboxylic acid; 0 to 15 weight percent of an unsaturated aliphatic polycarboxylic acid; 6 to 50 weight percent of at least one of an aliphatic diol and a glycidyl ester of an alkanoic acid; 2 to 5 weight percent of a branching agent; and 1 to 5 weight percent of an epoxy.

According to some embodiments of the present invention, polyester toner resins may include 0 to 25 weight percent of alkoxylated bisphenol A; 8 to 40 weight percent of an aliphatic diol; 5 to 30 weight percent of an unsaturated aliphatic polycarboxylic acid; 10 to 50 weight percent of an aromatic polycarboxylic acid; 2 to 5 weight percent of a branching agent; and 1 to 5 weight percent of an epoxy.

Also provided according to some embodiments of the present invention are polyester toner resins that may include 0 to 25 weight percent alkoxylated Bisphenol A, 2 to 5 weight percent of a branching agent, and 1 to 5 weight percent of an epoxy; wherein the polyester toner resin may have an acid value between 18 and 35, a $T_g$ between 58 and 75° C., a $T_{1/2}$ between 120 and 180° C., and in some embodiments, a charge per mass of between −25 and −32 µC/g.

In some embodiments of the present invention, provided are toner resin compositions that may include a polyester toner resin according to an embodiment of the present invention.

In some embodiments of the present invention, provided are methods of producing a polyester toner resin according to an embodiment of the invention, that include reacting 40 to 65 weight percent of an aromatic polycarboxylic acid, 0 to 15 weight percent of an unsaturated aliphatic polycarboxylic acid, 6 to 50 weight percent of at least one of an aliphatic diol and a glycidyl ester of an alkanoic acid, and 2 to 5 weight percent of a branching agent, to form a polymer; and reactively extruding the polymer with 1 to 5 weight percent of an epoxy to form the polyester toner resin.

In some embodiments of the present invention, provided are methods of producing a polyester toner resin according to an embodiment of the invention that include reacting the 0 to 25 weight percent of alkoxylated bisphenol A, 10 to 50 weight percent of an aromatic polycarboxylic acid, 5 to 30 weight percent of an unsaturated aliphatic polycarboxylic acid, 8 to 40 weight percent of an aliphatic diol and 2 to 5 weight percent of a branching agent, to form a polymer; and reactively extruding the polymer with 1 to 5 weight percent of an epoxy to form the polyester toner resin.

DETAILED DESCRIPTION OF PREFERRED EMBODIMENTS

The invention is described more fully hereinafter. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "aromatic polycarboxylic acid" is meant to refer to an aromatic group with two or more carboxylic acid functional groups pendant therefrom. Any suitable polycarboxylic acid may be used, but exemplary polycarboxylic acids include terephthalic acid, isophthalic acid, naphthylene dicarboxylic acid, phthalic acid, and the like. The anhydrides of the aromatic polycarboxylic acids may also be used.

As used herein, the term "unsaturated aliphatic polycarboxylic acid" is meant to refer to a non-aromatic molecule with one or more alkene or alkyne bonds and further including two or more carboxylic acids. Any suitable unsaturated aliphatic polycarboxylic acid may be used, but exemplary aliphatic polycarboxylic acids include fumaric acid, maleic acid and hydride, citraconic acid, itaconic acid, glutaconic acid, and the like.

As used herein, the term "aliphatic diol" is meant to refer to a non-aromatic molecule with two hydroxy functional groups. Any suitable aliphatic diol may be used, but exemplary aliphatic diols include ethylene glycol, propylene glycol, diethylene glycol, neopentyl glycol, 1,4-cyclohexanedimethanol, 1,3-propanediol, 1,4-butanediol, 1,5-pentanediol, 1,6-hexanediol, 1,8-octanediol, 2,2,4-trimethyl-1,3-pentanediol, 2,2,4,4-tetramethyl-1,3-cyclobutanediol, and the like.

As used herein, the term "glycidyl ester of an alkanoic acid" is meant to refer to an alkanoic acid, such as straight or branched hexanoic acid, heptanoic acid, octanoic acid, nonanoic acid, decanoic acid, undecanoic acid, dodecanoic acid, and the like, that is esterified by a group that includes a glycidyl functionality. An exemplary glycidyl ester of an alkanoic acid is a glycidyl ester of neodecanoic acid, such as Glydexx N-10®.

As used herein, the term "branching agent" is meant to refer to a multifunctional carboxylic acid (or its corresponding anhydride) or a polyol that is added to a resin composition to provide branched polyesters. Suitable branching agents include trimellitic acid, trimellitic anhydride, pyromellitic dianhydride, trimethylolpropane, glycerol, pentaerythritol, citric acid, tartaric acid, 3-hydroxyglutaric acid, and the like.

As used herein, the term "epoxy" is meant to refer to a monomer or polymer that includes epoxy functional groups. Exemplary epoxies include, glycidyl methacrylate/acrylic acid copolymers glycidyl methacrylate/styrene copolymer and Novalac epoxies. The term epoxy does not include epoxies that include Bisphenol A.

According to some embodiments of the present invention, polyester toner resins may include 40 to 65 weight percent of an aromatic polycarboxylic acid; 0 to 15 weight percent of an unsaturated aliphatic polycarboxylic acid; 6 to 50 weight percent of at least one of an aliphatic diol and a glycidyl ester of an alkanoic acid; 2 to 5 weight percent of a branching agent; and 1 to 5 weight percent of an epoxy.

In some embodiments of the present invention, up to 25 weight percent of alkoxylated Bis A may be included in the composition. As used herein, the terms Bis-A and bisphenol A, refer to the following compound:

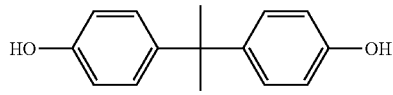

Exemplary alkoxylated Bis A include propoxylated and ethoxylated Bis A.

According to some embodiments of the invention, polyester toner resins may include 0 to 25 weight percent of alkoxylated bisphenol A; 8 to 40 weight percent of an aliphatic diol; 5 to 30 weight percent of an unsaturated aliphatic polycarboxylic acid; 10 to 50 weight percent of an aromatic polycarboxylic acid; 2 to 5 weight percent of a branching agent; and 1 to 5 weight percent of an epoxy.

Also provided according to some embodiments of the invention are polyester toner resins that may include 0 to 25 weight percent alkoxylated Bisphenol A, 2-5 weight percent of a branching agent, and 1 to 5 weight percent of an epoxy; wherein the polyester toner resin may have an acid value between 18 and 35, a $T_g$ between 58 and 75° C., a $T_{1/2}$ between 120 and 180° C., and in some embodiments, a charge per mass of between −25 and −32 μC/g.

The polyester toner resins according to embodiments of the present invention are herein described with reference to the monomers/molecules that are reacted to form the polyester toner resin. Thus, as one of ordinary skill in the art will understand, the final resin may include only the resulting crosslinked or non-crosslinked polymer formed from the reaction of the components and may not include any of the starting molecules/monomers. However, in some embodiments, unreacted monomer may still be present in the composition.

According to some embodiments of the present invention, toner compositions that include a polyester toner resin according to an embodiment of the invention are provided. Additional additives known by skilled artisans may also be employed with the toner resin compositions of the present invention, including, for example, paraffins, rheology modifying agents, inhibitors, lubricants, colorants, charge control agents, carrier materials, and shrink-reducing additives, to name a few. Any of the various suitable percentages of these additives can be used in conjunction with the toner resin composition.

According to some embodiments of the present invention, methods of producing a polyester toner resin of the invention are provided. La some embodiments, a mixture of an aromatic polycarboxylic acid, an unsaturated aliphatic polycarboxylic acid, an aliphatic diol and a branching agent are reacted to form a polymer; and then that polymer is reactively extruded with the epoxy to form a polyester toner resin according to an embodiment of the invention. In other embodiments, Bis A may be added to the mixture.

For example, in some embodiments of the invention, methods of producing a polyester toner resin according to an embodiment of the invention may include reacting 40 to 65 weight percent of an aromatic polycarboxylic acid, 0 to 15 weight percent of an unsaturated aliphatic polycarboxylic acid, 6 to 50 weight percent of at least one of an aliphatic diol and a glycidyl ester of an alkanoic acid, and 2 to 5 weight percent of a branching agent, to form a polymer; and reactively extruding the polymer with 1 to 5 weight percent of an epoxy to form the polyester toner resin.

In addition, in some embodiments of the present invention, methods of producing a polyester toner resin according to an embodiment of the invention include reacting the 0 to 25 weight percent of alkoxylated bisphenol A, 10 to 50 weight percent of an aromatic polycarboxylic acid, 5 to 30 weight percent of an unsaturated aliphatic polycarboxylic acid, 8 to 40 weight percent of an aliphatic diol and 2 to 5 weight percent of a branching agent, to form a polymer; and reactively extruding the polymer with 1 to 5 weight percent of an epoxy to form the polyester toner resin.

The present invention will now be described in more detail with reference to the following examples. However, these examples are given for the purpose of illustration and are not to be construed as limiting the scope of the invention.

EXAMPLES

Example A

Polyester Toner Resin Intermediates

Example A1

In a 5 liter four-neck glass flask equipped with a thermometer, stainless steel stirrer, nitrogen inlet, and condenser were placed 921.3 g of propoxylated Bisphenol A (KH-52), 373.7 g of ethylene glycol (EG), 656.7 g of propylene glycol (PG), 99.9 g of trimethylol propane (TMP), 1.85 g of dibutyltin oxide, and 1888.3 g of terephthalic acid (TPA). The materials were reacted under a nitrogen stream at 190° C. for 3 hours, 220° C. for 3 hours and 230° C. for 2 hours, at which point the reaction mixture became clear. The temperature was reduced to 170° C., and 1.85 g of hydroquinone and 710.5 g of fumaric acid (FA) were added into the flask and the reaction continued at 190° C. for 2 hours and at 230° C. for 4 hours. The obtained resin was a light yellow solid and had DSC Tg: 60° C.; acid value: 24; GPC molecular weight of Mn: 4,118, Mw: 38,526 and molecular weight distribution (Mw/Mn): 9.4; Shimadzu (scan rate: 6 C/min; load: 10 kg; die: 1 mm) $T_s$: 78° C., $T_{fb}$: 88° C., $T_{1/2}$: 113° C., and $T_{end}$: 120° C.; ARES DMA storage modulus G'@120° C. is 2,507 Pa, as measured at 1 Hz, complex viscosity Eta*@120° C.: 15,919 Poise and Tan Delta@120° C.: 3.9; Ceast melt index@125° C./2.16 kg: 15.42 grams/10 minutes.

Examples A2-A8

The polyester resins in Examples A2-A8 were prepared using the methods described with reference to Example A1, except that the mole ratios of the reactants were varied. Each of the examples used 20 weight percent of the Bis A monomer. The compositions (mole ratios) and properties of the polyesters are summarized in Table 1.

TABLE 1

| Sample ID | A6 | A5 | A4 | A3 | A2 | A1 | A7 | A8 |
|---|---|---|---|---|---|---|---|---|
| Alcohol Monomer KH-52/EG/PG | 15/35/50 | 15/35/50 | 15/35/50 | 15/35/50 | 15/35/50 | 15/35/50 | 15/35/50 | 15/35/50 |
| Acid Monomer FA/TPA | 15/85 | 25/75 | 30/70 | 32/68 | 32/68 | 35/65 | 40/60 | 50/50 |
| Branching Agent TMP | 2 wt % | 2 wt % | 2 wt % | 2 wt % | 2 wt % | 2 wt % | 2 wt % | 2 wt % |
| OH/COOH | 1.10 | 1.10 | 1.09 | 1.09 | 1.06 | 1.05 | 1.05 | 1.05 |
| Tg (° C.) | 67 | 65 | 63 | 60 | 60 | 60 | 56 | 54 |
| Acid Value | 16 | 17 | 21 | 16 | 24 | 24 | 22 | 29 |
| Eta* @120° C. | 13,698 | 13,180 | 21,006 | 16,047 | 14,308 | 15,919 | 13,821 | 9,183 |
| G' @120° C. (Pa) | 1,499 | 1,379 | 4,568 | 2,638 | 1,848 | 2,507 | 2,286 | 2,730 |
| Tan Delta @120° C. | 5.7 | 5.9 | 2.7 | 3.7 | 4.8 | 3.9 | 3.7 | 1.9 |
| Mn | 3,944 | 3,087 | 4,295 | 4,458 | 3,726 | 4,118 | 4,240 | 2,784 |
| Mw | 23,305 | 23,103 | 62,151 | 39,321 | 29,693 | 38,526 | 47,566 | 52,664 |
| Mw/Mn | 6.0 | 7.5 | 15 | 9 | 8 | 9.4 | 11 | 19 |
| $T_s$ (° C.) | 88 | 83 | 84 | 79 | 81 | 78 | 77 | 73 |
| $T_{fb}$ (° C.) | 99 | 94 | 101 | 97 | 94 | 88 | 88 | 95 |
| $T_{1/2}$ (° C.) | 117 | 117 | 126 | 120 | 116 | 113 | 113 | 135 |
| $T_{end}$ (° C.) | 125 | 124 | 134 | 127 | 123 | 120 | 121 | 151 |

Example A9

In Examples A9, trimellitic anhydride (TMA) replaced TMP as the branching agent in a one step reaction. The resin in Example A9 was prepared by the following method. In a 5 liter four-neck glass flask equipped with a thermometer, stainless steel stirrer, nitrogen inlet, and condenser were placed 978 g of propoxylated Bisphenol A (KH-52), 397 g of ethylene glycol (EG), 695 g of propylene glycol (PG), 1.85 g of dibutyltin oxide, 1.9 g, of hydroquinone, 1745 g of terephthalic acid (TPA), 665 g of fumaric acid (FA) and 141 g of trimellitic anhydride (TMA). The reaction was carried out under nitrogen at 190° C. for 2 hours, 220° C. for 4 hours and 230° C. for 6 hours. The obtained resin was a light yellow solid and had DSC Tg: 61° C.; acid value: 23; GPC molecular weight of Mn: 4,345, Mw: 84,315 and Mw/Mn: 19.4; Shimadzu (scan rate: 6 C/min; load: 10 kg; die: 1 mm) $T_s$: 74° C., $T_{fb}$: 97° C., $T_{1/2}$: 129° C., and $T_{end}$: 140° C.; ARES DMA storage modulus G'@120° C. is 7,646 Pa, as measured at 1 Hz, complex viscosity Eta*@120° C.: 28,066 Poise and Tan Delta@120° C.: 2.1; Ceast melt index@125° C./2.16 kg: 5.29 grams/10 minutes.

Examples A10-A13

The polyester resins in Examples A10-A13 do not include Bis A. The resin in Example A10 was prepared in the following manner: In a 5 liter four-neck glass flask equipped with a thermometer, stainless steel stirrer, nitrogen inlet and condenser were placed 403.3 g of ethylene glycol (EG), 847.9 g of propylene glycol (PG), 212 g of Glydexx N-10 (N-10), 177.6 g of trimethylol propane (TMP), 2.1 g of dibutyltin oxide and 2383 g of terephthalic acid (TPA). The reaction was carried out in nitrogen stream at 190° C. for 3 hours, 220° C. for 3 hours and 230° C. for 3 hours at which time the reaction became clear. The temperature was then reduced to 170° C. and 2.1 g of hydroquinone and 555 g of fumaric acid (FA) was added into the flask. The reaction was continued at 190° C. for 2 hours and at 230° C. for 4 hours. The obtained resin was a light yellow solid and had DSC Tg: 57° C.; acid value: 27; GPC molecular weight of Mn: 3,787, Mw: 28,250 and Mw/Mn: 7.5; Shimadzu (scan rate: 6 C/min; load: 10 kg; die: 1 mm) $T_s$: 76° C., $T_{fb}$: 89° C., $T_{1/2}$: 113° C., and $T_{end}$: 121° C.; ARES DMA storage modulus G'@120° C. is 2,517 Pa, as measured at 1 Hz, complex viscosity Eta*@120° C.: 18,047 Poise and Tan Delta@120° C.: 4.4. Example A11 was prepared in the same manner as Example 10, except that the ratio of FA to TPA was 20:80.

In Examples A12 and A13, neopentyl Glycol (NPG) was used to replace Glydexx N-10 (N-10). The data is summarized in Table 2.

TABLE 2

| Sample ID | A10 | A11 | A12 | A13 |
|---|---|---|---|---|
| Alcohol Monomer | PG/EG/N-10 60/35/5 | PG/EG/N-10 60/35/5 | PG/EG/NPG 60/30/10 | PG/EG/NPG 60/30/10 |
| Acid Monomer FA/TPA | 25/75 | 20/80 | 20/80 | 25/75 |
| Branching Agent TMP | 4 wt % | 4 wt % | 4 wt % | 4 wt % |
| Tg (° C.) | 57 | 61 | 63 | 62 |
| Acid Value | 27 | 28 | 10 | 23 |
| Eta* @120° C. (Poise) | 18,047 | 28,300 | 44,364 | 48,380 |
| G' @120° C. (Pa) | 2,517 | 4,974 | 14,446 | 15,332 |
| Tan Delta @120° C. | 4.4 | 3.4 | 1.7 | 1.7 |
| Mn | 3,787 | 3,289 | 4,416 | 4,620 |
| Mw | 28,250 | 27,528 | 82,649 | 86,860 |
| Mw/Mn | 8 | 8 | 19 | 19 |
| $T_s$ (° C.) | 76 | 79 | 85 | 79 |
| $T_{fb}$ (° C.) | 89 | 97 | 95 | 85 |
| $T_{1/2}$ (° C.) | 113 | 120 | 134 | 125 |
| $T_{end}$ (° C.) | 121 | 128 | 146 | 136 |

Example B

Crosslinked Polyesters

The polyester resins in the example A were crosslinked with different level of GMA acrylic (Fine-Tone® A-266A, manufactured by Reichhold Inc.) during extrusion. By controlling the level of crosslinker, extrusion temperature, or feed rate, the properties of the crosslinked polyesters can be adjusted Example B1

The polyester resin A1 was crosslinked with 2 wt % GMA acrylic Fine-Tone A-266A during extrusion in a twin-screw extruder under the following conditions: feed rate: 0.75; RPM: 300; temperature profile: 65° C./180° C./210° C./230° C./230° C./230° C./230° C./230° C. The obtained crosslinked polyester was a light yellow solid and had DSC Tg: 61° C.; acid value: 22; GPC molecular weight of Mn: 3,937, Mw: 74,600 and Mw/Mn: 19; Shimadzu (scan rate: 6 C/min; load: 10 kg; die: 1 mm) $T_s$: 75° C., $T_{fb}$: 100° C., $T_{1/2}$: 136° C., and $T_{end}$: 147° C.; ARES DMA storage modulus G'@120° C. is 7,795 Pa, as measured at 1 Hz, complex viscosity Eta*@120° C.: 27,157 Poise and Tan Delta@120° C.: 2.0; Ceast melt index@135° C./12.5 kg: 50.4 grams/10 minutes.

Example B2-B4

The polyester resin A1 was crosslinked with different levels of GMA acrylic Fine-Tone® A-266A, manufactured by Reichhold Inc., (1, 3 and 5 wt %) during extrusion under the following conditions: feed rate: 1.0; RPM: 300; temperature profile: 65° C./120° C./150° C./180° C./180° C./190° C./200° C./220° C. The data is summarized in Table 3

TABLE 3

| Sample ID | B2 | B3 | B4 |
|---|---|---|---|
| Crosslinker (A-266A) | 1 wt % | 3 wt % | 5 wt % |
| Tg (° C.) | 58 | 61 | 61 |
| Acid Value | 23 | 22 | 17 |
| Eta* @120 C. (Poise) | 21,616 | 29,290 | 39,989 |
| G' @120 C.(Pa) | 4,524 | 7,766 | 13,873 |
| Tan Delta @120 C. | 2.8 | 2.2 | 1.5 |
| $T_s$ (° C.) | 81 | 83 | 82 |
| $T_{fb}$ (° C.) | 94 | 97 | 107 |
| $T_{1/2}$ (° C.) | 121 | 130 | 149 |
| $T_{end}$ (° C.) | 130 | 141 | 163 |

Example B5

The polyester resin A2 was crosslinked with 2 wt % GMA acrylic Fine-Tone® A-266A, manufactured by Reichold Inc., during extrusion under the following conditions: feed rate: 0.7; RPM: 300; temperature profile: 65° C./180° C./210° C./230° C./230° C./230° C./230° C./230° C. The obtained crosslinked polyester was a light yellow solid with a DSC Tg: 62° C.; acid value: 22; GPC molecular weight of Mn: 3,101, Mw: 53,143 and Mw/Mn: 17; Shimadzu (scan rate: 6 C/min; load: 10 kg; die: 1 mm) $T_s$: 86° C., $T_{fb}$: 102° C., $T_{1/2}$: 139° C., and $T_{end}$: 150° C.; ARES DMA storage modulus G'@120° C. is 12,156 Pa, as measured at 1 Hz, complex viscosity Eta*@120° C.: 39,327 Poise and Tan Delta@120° C.: 1.8; Ceast melt index@135° C./12.5 kg: 20.2 grams/10 minutes.

Example B6-B9

The polyester resin A3 was crosslinked with different levels of GMA acrylic Fine-Tone® A-266A, manufactured by Reichhold Inc., (2-3 wt %) during extrusion under different conditions. The data is summarized in Table 4.

TABLE 4

| Sample ID | B6 | B7 | B8 | B9 |
|---|---|---|---|---|
| Extruder: Temp Profile | High Temp* | High Temp* | Low Temp** | Low Temp** |
| Extruder: Feed Rate | 0.5 | 1.0 | 0.5 | 1.0 |
| Extruder: RPM | 300 | 300 | 300 | 300 |
| Crosslinker (A-266A) | 2 wt % | 2 wt % | 3 wt % | 3 wt % |
| Tg (° C.) | 62 | 62 | 62 | 61 |
| MFI @135° C./12.5 kg | 2.5 | 4.4 | 8.3 | 22.0 |
| $T_s$ (° C.) | 83 | 86 | 85 | 84 |
| $T_{fb}$ (° C.) | 114 | 107 | 109 | 104 |
| $T_{1/2}$ (° C.) | 163 | 150 | 152 | 141 |
| $T_{end}$ (° C.) | 187 | 166 | 168 | 153 |
| Mn | 3,774 | 3,644 | 3,828 | 3,882 |
| Mw | 43,651 | 57,039 | 54,235 | 70,475 |
| Mw/Mn | 11.6 | 15.7 | 14.2 | 18.2 |

*Extruder High Temp Profile: 65° C./180° C./210° C./230° C./230° C./230° C./230° C./230° C.
**Extruder Low Temp Profile: 65° C./120° C./150° C./180° C./180° C./190° C./200° C./220° C.

Example B10-B13

The polyester resin A10 (no Bis A) was crosslinked with different levels of GMA acrylic Fine-Tone® A-266A, manufactured by Reichhold Inc., and extruded under different conditions. The data is summarized in Table 5.

TABLE 5

| Sample ID | B11 | B12 | B13 | B10 |
|---|---|---|---|---|
| Crosslinker (A-266A) | 1 wt % | 3 wt % | 5 wt % | 5 wt % |
| Extrader: Temp Profile | Low temp* | Low temp* | Low temp* | High temp** |
| Extruder: Feed Rate | 1.0 | 1.0 | 1.0 | 0.5 |
| Extruder: RPM | 300 | 300 | 300 | 300 |
| Tg (° C.) | 58 | 59 | 60 | 61 |
| Acid Value | 25 | 24 | 23 | 21 |
| Eta* @120° C. (Poise) | 20,824 | 27,782 | 41,064 | 51,841 |
| G' @120 C. (Pa) | 3,695 | 5,933 | 10,680 | 16,552 |
| Tan Delta @120° C. | 3.4 | 2.8 | 2.2 | 1.7 |
| $T_s$ (° C.) | 83 | 82 | 84 | 84 |
| $T_{fb}$ (° C.) | 93 | 95 | 97 | 104 |
| $T_{1/2}$ (° C.) | 119 | 122 | 127 | 140 |
| $T_{end}$ (° C.) | 128 | 130 | 137 | 152 |
| Mn | 3,854 | 3,974 | 4,074 | 3,807 |
| Mw | 37,265 | 46,527 | 59,904 | 76,086 |
| Mw/Mn | 9.7 | 11.7 | 14.7 | 20.0 |

**Extruder High Temp Profile: 65° C./180° C./210° C./230° C./230° C./230° C./230° C./230° C.
*Extruder Low Temp Profile: 65° C./120° C./150° C./180° C./180° C./190° C./200° C./220° C.

Example B14

The polyester resin A11 was crosslinked with 2.5 wt % GMA acrylic Fine-Tone® A-266A, manufactured by Reichhold Inc., while extrusion under the following conditions: feed rate: 0.5; RPM: 300; temperature profile: 65° C./180° C./210° C./230° C./230° C./230° C./230° C./230° C. The obtained crosslinked polyester was a light yellow solid with a DSC Tg: 63° C.; acid value: 24; GPC molecular weight of Mn: 3,380, Mw: 64,255 and Mw/Mn: 19; Shimadzu (scan rate: 6 C/min; load: 10 kg; die: 1 mm) $T_s$: 87° C., $T_{fb}$: 103° C., $T_{1/2}$: 136° C., and $T_{end}$: 146° C.; ARES DMA storage modulus G'@120° C. is 17,611 Pa, as measured at 1 Hz, complex viscosity Eta*@120° C.: 58.196 Poise and Tan Delta@120° C.: 1.8; Ceast melt index@135° C./12.5 kg: 27.1 grams/10 minutes.

Example C

Toners

The crosslinked polyester resins in Example B were formulated into toners with 5 wt % carbon black, 3 wt % wax and 1 wt % charge control agent (N4P) through extrusion under the following conditions: RPM: 150, feed rate: 0.5, and temperature profile: 65° C./85° C./105° C./120° C./120° C./120° C./120° C./120° C./120° C./120° C. Using A1 (low Bis A, no crosslinker) and A12 (no Bis A, no crosslinker) as controls, GMA Acrylic (crosslinker) was added and its effects on the properties of toners were assessed. Toner properties evaluated included: DSC Tg, Shimadzu temperatures, ARES DMA storage and complex viscosity and charge per mass (Q/m). The data is summarized in Table 6.

TABLE 6

| Toner ID | C1 | C2 | C3 | C4 | C5 |
|---|---|---|---|---|---|
| Polyester resin | A1 | B3 | B4 | A10 | B10 |
| GMA acrylic | 0% | 3 wt % | 5 wt % | 0% | 5 wt % |
| Type | Low Bis A | Low Bis A | Low Bis A | No Bis A | No Bis A |
| Tg (° C.) | 59 | 60 | 61 | 59 | 62 |
| Eta* @120° C. (poise) | 32,517 | 38,871 | 64,570 | 32,007 | 79,271 |
| G' @120° C. (Pa) | 6,978 | 21,818 | 22,571 | 5,913 | 26,444 |
| Tan Delta @120° C. | 2.8 | 2.0 | 1.5 | 3.3 | 1.6 |
| Q/m (μc/g) | −25.7 | −30.8 | −29.7 | −27.5 | −32.2 |
| $T_s$ (° C.) | 80 | 79 | 77 | 81 | 81 |
| $T_{fb}$ (° C.) | 93 | 98 | 102 | 92 | 103 |
| $T_{1/2}$ (° C.) | 116 | 124 | 131 | 117 | 131 |
| $T_{end}$ (° C.) | 124 | 133 | 141 | 125 | 140 |

As can be seen from the data presented above, compared to the 0% GMA acrylic toner samples, 3-5% GMA acrylic improved the charge per mass (Q/m) of the toners from −25.7 or −27.5 μC/g to −30.8 or −32 μC/g. The 3-5% GMA also improved the Theological properties of the toners, including the Shimadzu $T_{1/2}$, DMA storage modulus and complex viscosity, all of which may be important in hot offset resistance.

Although selected embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A toner composition comprising
   a polyester toner resin formed from the reaction of monomers comprising
   40 to 65 weight percent of an aromatic polycarboxylic acid;
   0 to 15 weight percent of an unsaturated aliphatic polycarboxylic acid;
   6 to 50 weight percent of at least one of an aliphatic diol and a glycidyl ester of an alkanoic acid;
   2 to 5 weight percent of a branching agent; and
   1 to 5 weight percent of an epoxy comprising a glycidyl methacrylate/styrene copolymer or glycidyl methacrylate/acrylic acid copolymer; and
   a charge control agent.

2. The toner composition of claim 1,
   wherein the aliphatic diol comprises at least one of ethylene glycol and propylene glycol.

3. The toner composition of claim 1,
   wherein the glycidyl ester of an alkanoic acid is a glycidyl ester of neodecanoic acid.

4. The toner composition of claim 1,
   wherein the branching agent comprises at least one of trimethylol propane and trimellitic anhydride.

5. The toner composition of claim 1, wherein the epoxy comprises a glycidyl methacrylate/styrene copolyiner.

6. The toner composition of claim 1,
   wherein the aromatic polycarboxylic acid is terephthalic acid.

7. The toner composition of claim 1,
   wherein the unsaturated aliphatic polycarboxylic acid is fumaric acid.

8. The toner composition of claim 1, further comprising one or more of the additives selected from the group consisting of paraffins, rheology modifying agents, inhibitors, lubricants, colorants, carrier materials and shrink-reducing additives.

9. A toner composition comprising
   a polyester toner resin formed from the reaction of monomers comprising
   0 to 25 weight percent of alkoxylated bisphenol A;
   8 to 40 weight percent of an aliphatic diol;
   5 to 30 weight percent of an unsaturated aliphatic polycarboxylic acid;
   10 to 50 weight percent of an aromatic polycarboxylic acid;
   2 to 5 weight percent of a branching agent; and
   1 to 5 weight percent of an epoxy comprising a glycidyl methacrylate/styrene copolymer or a glycidyl methacrylate/acrylic acid copolymer; and
   a charge control agent.

10. The toner composition of claim 9, wherein the aliphatic diol comprises at least one of ethylene glycol and propylene glycol.

11. The toner composition of claim 9, wherein the epoxy comprises a glycidyl methacrylate/styrene copolymer.

12. The toner composition of claim 9, wherein the branching agent comprises at least one of an aliphatic triol and trimellitic anhydride.

13. The toner composition of claim 9, wherein the aliphatic triol is trimethylol propane.

14. The toner composition of claim 9, wherein the aromatic polycarboxylic acid comprises at least one of terephthalic acid and isophthalic acid.

15. The toner composition of claim 9, wherein the unsaturated aliphatic polycarboxylic acid is fumaric acid.

16. The toner composition of claim 9, further comprising one or more of the additives selected from the group consisting of paraffins, rheology modifying agents, inhibitors, lubricants, colorants, carrier materials and shrink-reducing additives.

* * * * *

UNITED STATES PATENT AND TRADEMARK OFFICE
CERTIFICATE OF CORRECTION

Page 1 of 1

PATENT NO. : 8,034,522 B2
APPLICATION NO. : 11/937077
DATED : October 11, 2011
INVENTOR(S) : Liu et al.

It is certified that error appears in the above-identified patent and that said Letters Patent is hereby corrected as shown below:

Column 4, Line 51: Please correct "La some" to read -- In some --

Column 11, Line 20: Please correct "Theological" to read -- rheological --.

Signed and Sealed this
Third Day of January, 2012

David J. Kappos
*Director of the United States Patent and Trademark Office*